United States Patent [19]
Yokoyama et al.

[11] Patent Number: 6,102,640
[45] Date of Patent: *Aug. 15, 2000

[54] BOLT RETAINER FOR MEMBERS TO BE FIXED TOGETHER BY THE BOLT

[75] Inventors: Kosuke Yokoyama; Tsutomu Shinohara; Michio Yamaji; Hiroshi Morokoshi; Tetsuya Kojima, all of Osaka, Japan

[73] Assignee: Fujikin Incorporated, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/073,386

[22] Filed: May 6, 1998

[30] Foreign Application Priority Data

Sep. 24, 1997 [JP] Japan ..................................... 9-258081

[51] Int. Cl.⁷ .............................. F16B 21/18; F16B 39/00
[52] U.S. Cl. .......................... 411/353; 411/107; 411/360; 411/970; 411/999
[58] Field of Search ..................................... 411/352, 353, 411/107, 360, 542, 970, 999

[56] References Cited

U.S. PATENT DOCUMENTS

| | | |
|---|---|---|
| 2,761,484 | 9/1956 | Sternick et al. ......................... 411/353 |
| 3,217,774 | 11/1965 | Pelochino . |
| 3,255,799 | 6/1966 | Heimovics ........................... 411/999 X |
| 4,934,888 | 6/1990 | Corsmeier et al. . |
| 5,040,917 | 8/1991 | Camuffo .............................. 411/999 X |
| 5,388,940 | 2/1995 | Herren ................................ 411/970 X |

FOREIGN PATENT DOCUMENTS

| | | |
|---|---|---|
| 196 08 948 | 9/1997 | Germany . |
| 2 180 906 | 4/1987 | United Kingdom . |

*Primary Examiner*—Neill Wilson
*Attorney, Agent, or Firm*—Armstrong, Westerman, Hattori, McLeland & Naughton

[57] ABSTRACT

An annular recess is formed in an inner periphery defining a bolt shank bore and has fitted therein an annular elastic member having elasticity radially thereof and having an inside diameter smaller than the outside diameter of the shank of a bolt. The shank bore has at an intermediate part thereof a stepped portion so as to give an increased diameter to a bore portion from the intermediate part to one end of the bore, and a hollow cylindrical member for preventing the elastic member from slipping out is inserted in the shank bore from the bore end so as to form a clearance between the stepped portion and the preventing member, whereby the annular recess is formed.

4 Claims, 3 Drawing Sheets

BOLT RETAINER FOR MEMBERS TO BE FIXED TOGETHER BY THE BOLT

BACKGROUND OF THE INVENTION

The present invention relates to a device for preventing a bolt from slipping out of a bore for inserting the shank of the bolt even when the externally threaded portion of the bolt is disengaged from an internally threaded portion.

In fluid control apparatus, for example, for use in manufacturing semiconductors, coupling members are fixed to a base plate with bolts, and on-off valves are each fixed to one or some of the coupling members with bolts. These bolts are not always screwed in from above; some are often screwed in laterally or from below.

The conventional fluid control apparatus has the problem that in the case where the base plate is vertical, the bolt is likely to slip out of a bolt shank bore when the externally threaded portion of the bolt is disengaged from an internally threaded portion.

SUMMARY OF THE INVENTION

An object of the present invention is to provide a device for preventing a bolt from slipping out of a bolt shank bore when unfastened in the case where the bolt is screwed in laterally or from below for fixing.

The present invention provides a device for preventing a bolt from slipping off for use in fixing a member formed with a bolt shank bore to a stationary member having a threaded bore, the device being adapted to prevent the bolt from slipping out of the shank bore when the bolt is unfastened, the device being characterized in that an annular recess is formed in a shank bore-defining inner periphery of the member to be fixed and has fitted therein an annular elastic member having elasticity radially thereof and having an inside diameter smaller than the outside diameter of a shank of the bolt.

For example, an O-ring is used as the annular elastic member.

When the bolt as screwed in the threaded bore laterally or from below is disengaged from the threaded bore by being unfastened, the bolt is retained by the elastic force of the elastic member and therefore prevented from slipping off.

Preferably, the shank bore has at an intermediate part thereof a first stepped portion so as to give an increased diameter to a bore portion extending from the intermediate part to an end of the bore, and a hollow cylindrical member for preventing the elastic member from slipping out is inserted in the shank bore from said end so as to form a clearance between the stepped portion and the preventing member, whereby the annular recess is formed. The elastic member is then easy to insert into the recess and can be reliably prevented from slipping out.

Preferably, the increased-diameter portion of the shank bore has a second stepped portion in the vicinity of said end so as to give a further increased diameter to a bore portion from the second stepped portion to said end, and the preventing member is formed with a flange in contact with the second stepped portion. When the preventing member is fitted into the shank bore, the flange comes into contact with the second stepped portion, whereby the preventing member is positioned in place properly.

Preferably, the preventing member is formed with an annular ridge in engagement with a shank bore-defining wall for precluding the preventing member from slipping out of the shank bore. The preventing member can then be effectively precluded from slipping off.

DESCRIPTION OF THE PREFERRED EMBODIMENT

An embodiment of the present invention will be described below with reference to the drawings. In the following description, the terms "upper," "lower," "left" and "right" refer respectively to the upper side, the lower side and the left- and right-hand sides of FIG. 1.

Figure 1:
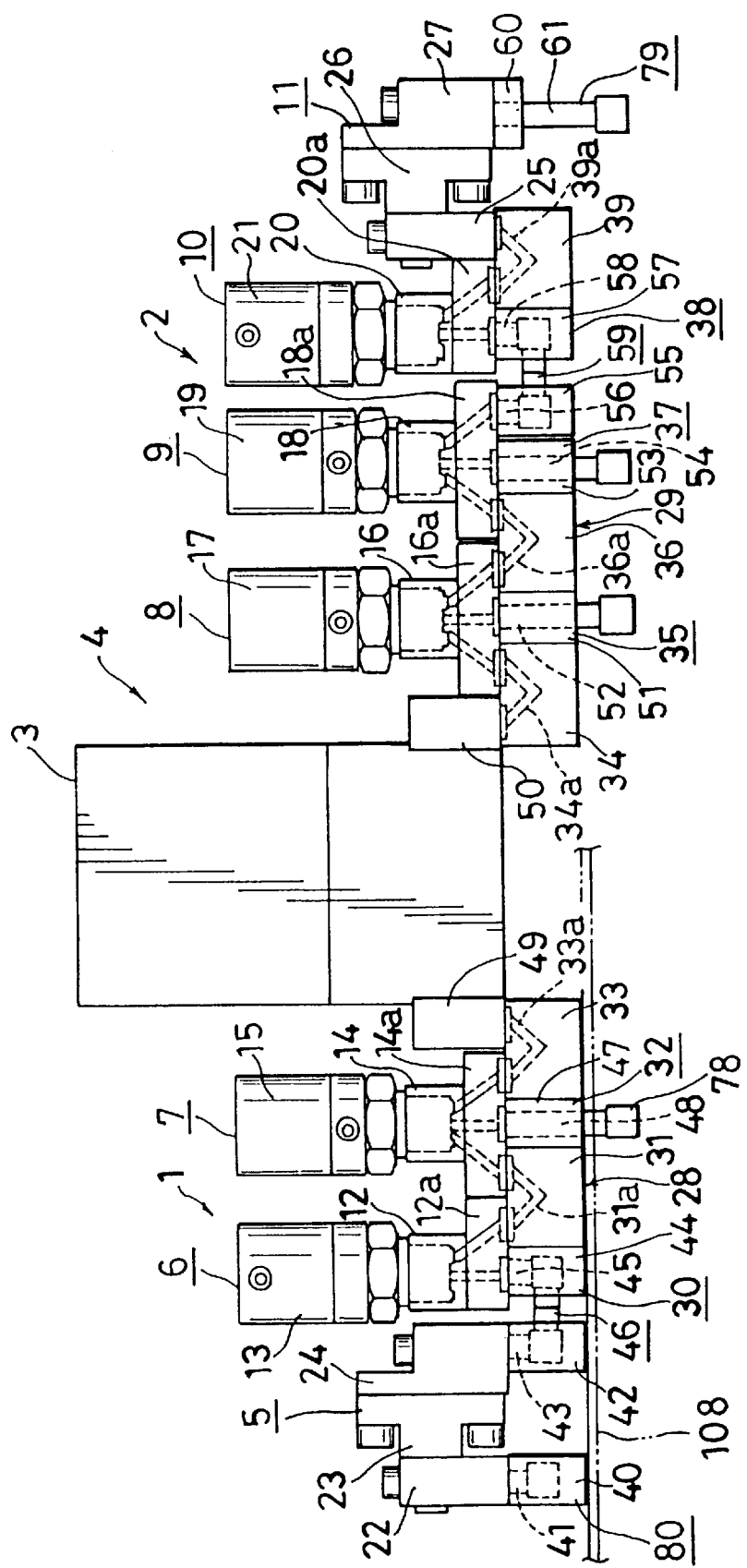
FIG. 1 is a front view showing an example of fluid control apparatus wherein bolt slipping-off preventing devices of the invention are used.
Figure 2:
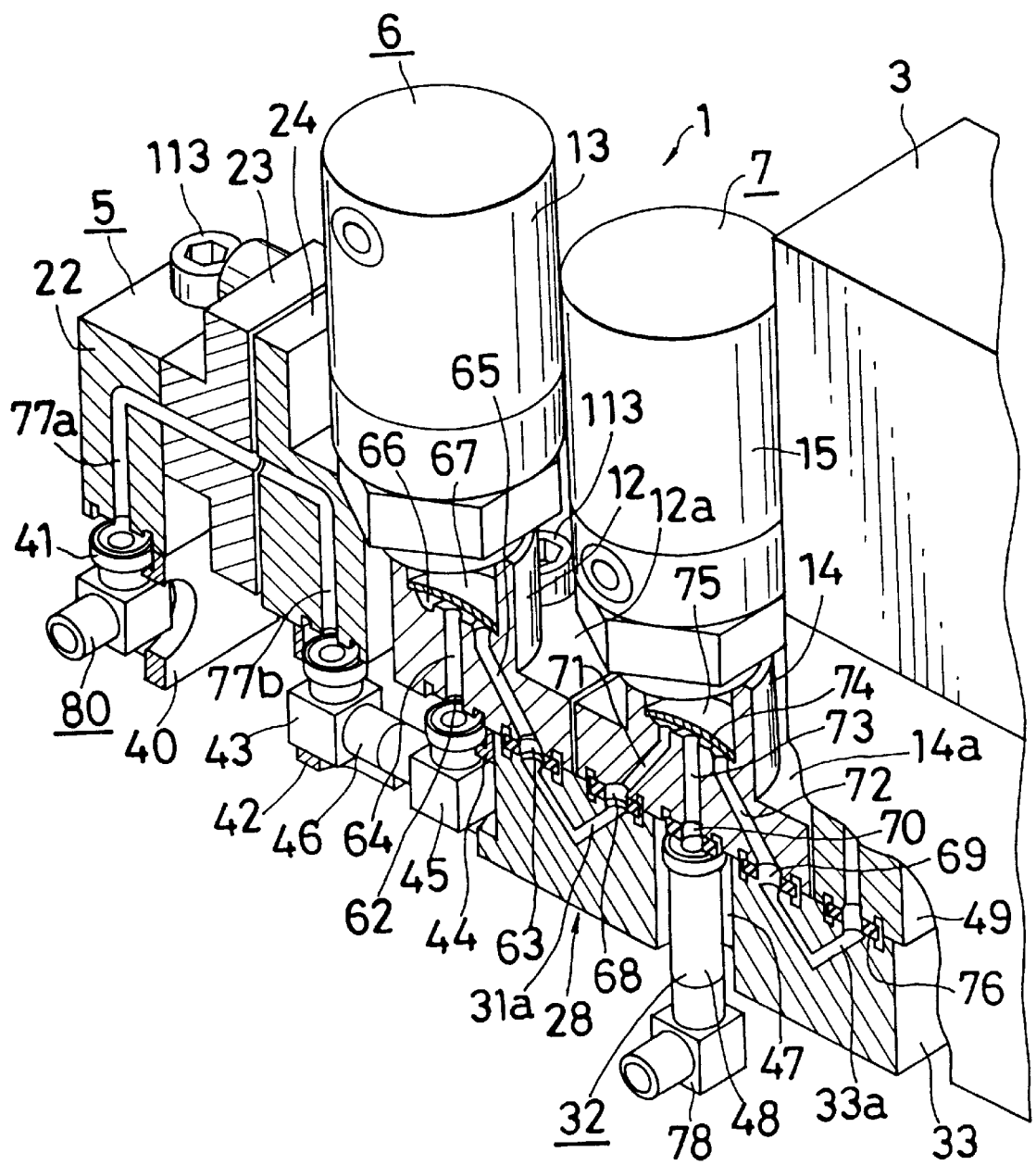
FIG. 2 is an exploded fragmentary perspective view partly broken away and showing the apparatus of FIG. 1 on an enlarged scale.

FIGS. 1 and 2 show an example of fluid control apparatus having incorporated therein the device of the invention for fixing a lower member. The fluid control apparatus 4 is adapted for use in semiconductor manufacturing equipment or the like and comprises a massflow controller 3, and shutoff-opening devices 1, 2 at the left and right of the controller 3.

The shutoff-opening device 1 at left comprises a first on-off valve 6 at left, a second on-off valve 7 at right and a first valve mount 28 having the two valves 6, 7 mounted thereon. The first valve mount 28 comprises a plurality of couplings 80, 30, 31, 32, 33 as will be described later. Disposed at the left of the left shutoff-opening device 1 is a first check valve 5.

The shutoff-opening device 2 at right comprises a third on-off valve 8 disposed at left, a fourth on-off valve 9 disposed at an intermediate position, a fifth on-off valve 10 disposed at right and a second valve mount 29 having these valve 8, 9, 10 mounted thereon.

The second valve mount 29 comprises a plurality of couplings 34, 35, 36, 37, 38, 39, 79 as will be described later. Disposed at the right of the right shutoff-opening device 2 is a second check valve 11.

The on-off valves 6, 7, 8, 9, 10 comprise respective main bodies 12, 14, 16, 18, 20 and respective actuators 13, 15, 17, 19, 21 mounted thereon from above for suitably opening and closing a channel through each valve main body. The first and fifth on-off valves 6, 10 are two-port valves, while the second, third and fourth on-off valves 7, 8, 9 are three-port valves. The main bodies 12, 14, 16, 18, 20 of the on-off valves 6 to 10 are provided at their lower ends with flanges 12a, 14a, 16a, 18a, 20a, respectively, which are rectangular when seen from above.

Each of the check valves 5, 11 comprises a left main body 22 (25) having an inlet in its bottom face, a middle main body 23 (26) screwed to the main body 22 (25) and a right main body 24 (27) having an outlet in its bottom face and fastened with screws to the middle main body 23 (26).

The massflow controller 3 is formed on the left side of its lower end with a rectangular parallelepipedal leftward extension 49 having an inlet in its bottom face, and on the right side of its lower end with a rectangular parallelepipedal rightward extension 50 having an outlet in its bottom face.

The bottom faces of the valve main bodies 22, 23, 24, 12, 14 at the left of the massflow controller 3 and the bottom face of the leftward extension 49 of the controller 3 are all flush with one another. The rightward extension 50 of the controller 3 and the valve main bodies 16, 18, 20, 25, 26, 27 have their bottom faces positioned all flush with one another.

The inlet of left main body 22 of the first check valve 5 is provided with a purge gas supply coupling 80 connected to a purge gas supply line and comprising a holding member 40 and an L-shaped channel member 41 held by the member 40.

The outlet of right main body 24 of the first check valve 5 is held in communication with an inlet of main body 12 of the first on-off valve 6 by a first inflow channel coupling 30 for introducing a fluid into the left shutoff-opening device 1. The coupling 30 comprises two holding members 42, 44 and a U-shaped communication channel member 46 held by these members 42, 44 and comprising two L-shaped channel members 43, 45 which are joined to each other.

Opposed to both the bottom face of rightward portion of main body 12 of the first on-off valve 6 and the bottom face of leftward portion of main body 14 of the second on-off valve 7 is a coupling 31 in the form of a rectangular parallelepipedal block for forming a first communication channel and having a V-shaped channel 31a for causing an outlet of the valve 6 to communicate with an inlet of the valve 7.

The main body 14 of the second on-off valve 7 has an inlet-outlet subopening, which is provided with a first subchannel coupling 32 comprising a holding member 47 and an I-shaped channel member 48 and held by the member 47. Attached to the lower end of the coupling 32 is a known L-shaped coupling 78 connected to a process gas supply line.

Disposed beneath both the rightward portion of main body 14 of the valve 7 and the leftward extension 49 of the massflow controller 3 is a coupling 33 in the form of a rectangular parallelepipedal block for forming a first outflow channel and having a V-shaped channel 33a for sending a fluid from the outlet of the valve 7 to the controller 3.

Disposed beneath both the bottom face of rightward extension 50 of the massflow controller 3 and the bottom face of leftward portion of main body 16 of the third on-off valve 8 is a coupling 34 in the form of a rectangular parallelepipedal block for forming a second inflow channel and having a V-shaped channel 34a for introducing a fluid from the controller 3 into the right shutoff-opening device 2.

The main body 16 of the third on-off valve 8 has an inlet-outlet subopening, which is provided with a second subchannel coupling 35 connected to an evacuating line and comprising a holding member 51 and an L-shaped channel member 52 and held by the member 51.

Disposed beneath both the bottom face of rightward portion of main body 16 of the third on-off valve 8 and the bottom face of leftward portion of main body 18 of the fourth on-off valve 9 is a coupling 36 in the form of a rectangular parallelepipedal block for forming a second communication channel and having a V-shaped channel 36a for causing an outlet of the valve 8 to communicate with an inlet of the valve 9.

The main body 18 of the fourth on-off valve 9 has an inlet-outlet subopening, which is provided with a third subchannel coupling 37 connected to a process gas supply line and comprising a holding member 53 and an L-shaped channel member 54 and held by the member 53.

An outlet of main body 18 of the fourth on-off valve 9 is held in communication with an inlet of main body 20 of the fifth on-off valve 10 by a third communication channel coupling 38, which comprises two holding members 55, 57 and a communication channel member 59 held by these members. The member 59 comprises two L-shaped channel members 56, 58 joined to each other.

Disposed beneath both the bottom face of rightward portion of main body 20 of the fifth on-off valve 10 and the bottom face of left main body 25 of the second check valve 11 is a coupling 39 in the form of a rectangular parallelepipedal block for forming a second outflow channel and having a V-shaped channel 39a for causing an outlet of the valve 10 to communicate with the inlet of the valve 11.

The outlet of right main body 27 of the second check valve 11 is provided with a purge gas discharge coupling 79 connected to a purge gas discharge line and comprising a holding member 60 and an L-shaped channel member 61 held by the member 60.

The first inflow channel coupling 30, first communication channel coupling 31, first subchannel coupling 32 and first outflow channel coupling 33 which are positioned at the left side of the controller 3 form the valve mount 28 of the left shutoff-opening device 1. The second inflow channel coupling 34, second subchannel coupling 35, second communication channel coupling 36, third subchannel coupling 37, third communication channel coupling 38 and second outflow channel coupling 39 which are positioned at the right side of the controller 3 provide the valve mount 29 of the right shutoff-opening device 2.

Thus, the left shutoff-opening device 1 has a purge gas channel through which a purge gas admitted through the check valve 5 is discharged via the first inflow channel coupling 30, the main body 12 of the first on-off valve 6, the first communication channel coupling 31, the main body 14 of the second on-off valve 7 and the first outflow channel coupling 33, and a process gas channel through which a process gas admitted from the bottom face of the first subchannel coupling 32 is discharged via the coupling 32, the main body 14 of the second on-off valve 7 and the first outflow channel coupling 33. The right shutoff-opening device 2 has a purge gas channel through which the purge gas introduced via the controller 3 is discharged by way of the second inflow channel coupling 34, second communication channel coupling 36, third communication channel coupling 38 and second outflow channel coupling 39; a process gas channel through which the process gas admitted through the controller 3 is fed to a process chamber via the second inflow channel coupling 34, second communication channel coupling 36 and third subchannel coupling 37; and an evacuating channel for drawing off the gas from these channels via the second subchannel coupling 35.

As shown on an enlarged scale in FIG. 2, the first check valve 5 has an inflow channel 77a and an outflow channel 77b which are opened downward. The main body 12 of the first on-off valve 6 is formed in its bottom face with an inlet 62 positioned approximately centrally thereof, and an outlet 63 positioned at right. The valve main body 12 is internally formed with an inflow channel 64 extending from the inlet 62 to a valve chamber 66, and an outflow channel 65 extending from the outlet 63 to the chamber 66. The actuator 13 of the first on-off valve 6 serves to operate a valve element 67 in the form of a diaphragm. When operated, the actuator 13 opens or closes the inflow channel 64 with the valve element 67. The main body 14 of the second on-off valve 7 is formed in its bottom face with an inlet 68 at left, an outlet 69 at right and an inlet-outlet subopening 70 positioned approximately in the center to serve as an inlet or outlet for other fluid. The valve main body 14 is internally formed with an inflow channel 71 extending from the inlet 68 to a valve chamber 74, a subchannel 73 extending from the subopening 70 to the chamber 74 and an outflow channel 72 extending from the outlet 69 to the chamber 74. The actuator 15 of the second on-off valve 7 serves to operate a valve element 75 in the form of a diaphragm. When operated, the actuator 15 opens or closes the subchannel 73 with the valve element 75. On the other hand, the inflow channel 71 extending to the inlet 68 of the second on-off valve 7 is always in communication with the outflow channel 72 extending to the outlet 69 through the valve chamber 74.

A seal 76 as shown in FIG. 2 is provided between each of the valve main bodies 22, 23, 24, 12, 14, 16, 18, 20, 25, 26, 27 and at least one of the members 41, 30, 31, 32, 33, 34, 35, 36, 37, 38, 39, 61 joined to the valve main body in butting contact. The check valves 5, 11 and the on-off valves 6, 7, 8, 9, 10 are each fastened to at least one of the couplings 80, 30, 31, 32, 33, 34, 35, 36, 37, 38, 39, 79 opposed thereto with bolts 113 screwed into the main body 22, 23, 24, 12, 14, 16, 18, 20, 25, 26 or 27 from above (see FIG. 2). The check valves 5, 11 and the on-off valves 6 to 10 can be removed upward by removing these bolts 113. In construction, the second check valve 11 is identical with the first check valve 5, the fifth on-off valve 10 with the first on-off valve 6, and the third and fourth on-off valves 8, 9 with the second on-off valve 7.

With the fluid control apparatus 4 having the foregoing construction, the process gas is admitted into the first subchannel coupling 32 of the left shutoff-opening device 1, with the first on-off valve 6 closed, the second on-off valve 7 held open, the third on-off valve 8 closed, the fourth on-off valve 9 held open and the fifth on-off valve 10 closed, whereupon the process gas flows through the main body 14 of the second on-off valve 7 and the first outflow channel coupling 33 into the massflow controller 3, wherein the gas has its flow rate regulated. The gas is then admitted into the right shutoff-opening device 2, thereafter flows through the second inflow channel coupling 34, the main body 16 of the third on-off valve 8, the second communication channel coupling 36, the main body 18 of the fourth on-off valve 9 and the third subchannel coupling 37 and is sent into the process chamber. When the purge gas is thereafter admitted into the first check valve 5, with the first on-off valve 6 held open, the second on-off valve 7 closed, the third on-off valve 8 closed, the fourth on-off valve 9 closed and the fifth on-off valve 10 held open, the purge gas flows through the first inflow channel coupling 30, the main body 12 of the first on-off valve 6, the first communication channel coupling 31, the main body 14 of the second on-off valve 7 and the first outflow channel coupling 33, reaches the massflow controller 3, further flows through the second inflow channel coupling 34, the main body 16 of the third on-off valve 8, the second communication channel coupling 36, the main body 18 of the fourth on-off valve 9, the third communication channel coupling 38, the main body 20 of the fifth on-off valve 10, second outflow channel coupling 39 and second check valve 11, and is discharged. At this time, the purge gas drives out with its own pressure the process gas remaining in the main body 14 of the second on-off valve 7, first outflow channel coupling 33, second inflow channel coupling 34 and second communication channel coupling 36, with the result that purge gas only flows through the apparatus in a short period of time.

With the shutoff-opening devices 1, 2, the first inflow channel coupling 30 and the third communication channel coupling 38 are common members, the first communication channel coupling 31, first outflow channel coupling 33, second inflow channel coupling 34, second communication channel coupling 36 and second outflow channel coupling 39 are common members, and subchannel couplings 32, 35, 37 are also common members. In other words, the right shutoff-opening device 2 is available only by adding one three-port on-off valve to the left shutoff-opening device 1 and adding to the valve mount 28 thereof the same members as the first communication channel coupling 31 and the first subchannel coupling 32. When the on-off valve to be added is a two-port valve, the fourth on-off valve 9 of the right shutoff-opening device 2 is replaced by a two-port valve, with the third subchannel coupling 37 removed from the mount 29. Thus, the left and right shutoff-opening devices 1 and 2 are amenable to various modifications.

With the embodiment shown in FIG. 1, the left shutoff-opening device 1 has two on-off valves 6, 7, while the right shutoff-opening device 2 has three on-off valves 8, 9, 10, whereas the number of on-off valves is variable suitably. Two shutoff-opening devices each having a suitable number of on-off valves are arranged respectively at the left and right sides of a massflow controller, and such arrangements are further arranged in parallel to provide a fluid control apparatus for use in semiconductor manufacturing equipment. The fluid control apparatus is installed by mounting the couplings 80, 30, 31, 32, 33, 34, 35, 36, 37, 38, 39 on a base plate 108 with bolts, attaching the fluid controllers, such as check valves 5, 11, on-off valves 6, 7, 8, 9, 10 and massflow controller 3, to the couplings 80, 30 to 39 as specified and fixing the base plate 108 in position.

Next with reference to FIG. 3, a description will be given of a device for fixing the coupling member, to be disposed between the base plate and fluid controllers, to the base plate with bolts.

Figure 3:
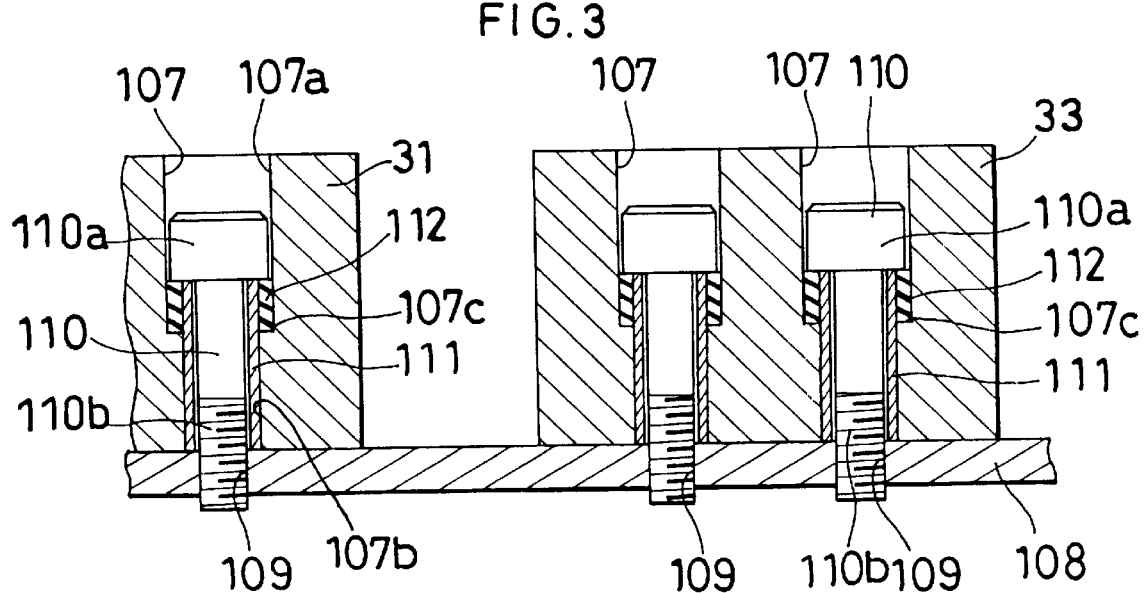
FIG. 3 is a sectional view showing a coupling member fixing device of the invention.

Referring to FIG. 3, two block couplings 31 for attaching the on-off valves 6, 7 thereto are mounted on the base plate 108. A screw bore 106 for use in attaching the block coupling 31 to the on-off valve main body is formed in the upper side of the coupling 31 at each of four corners thereof. A bolt bore 107 for inserting a coupling fixing bolt 110 therethrough for mounting the block coupling 31 on the base plate 108 is formed at each of two portions of the coupling 31 close to its central portion. The base plate 108 is formed with screw bores 109 for use in mounting the block coupling 31 on the base plate 108.

The bolt bore 107 of the block coupling 31 is formed by a large-diameter portion 107a having a diameter larger than the diameter of the head 110a of the coupling fixing bolt 110, and a small-diameter portion 107b continuous with the portion 107a, with a stepped portion 107c provided therebetween, and having a diameter intermediate between the diameter of the bolt head 110a and the diameter of the shank 110b of the bolt.

A sleevelike spacer 111 having a lower end bearing on the base plate 108 and an upper end positioned in the large-diameter portion 107a is fitted in the small diameter portion 107a of the bolt bore 107. The spacer 111 has an inside diameter larger than the diameter of the bolt shank 110b and an outside diameter smaller than the diameter of the bolt head 110a. The shank 110b of the coupling fixing bolt 110 is fitted in the spacer 111, with the bolt head 110a bearing on the upper end face of the spacer 111. The spacer 11 serves to determine the amount of tightening of the coupling fixing bolt 110, such that as the bolt 110 inserted through the bore 107 is screwed into the screw bore 109 of the base plate 108, the head 110a of the bolt 110 is supported by the spacer 111 bearing on the base plate 108, preventing further tightening of the bolt.

An annular rubber washer 112 having an outside diameter approximately equal to the diameter of the head 110a of the coupling fixing bolt 110 is fitted around the upper end of the spacer 111. The rubber washer 112 is held between the head 110a of the bolt 110 and the stepped portion 107c of the bolt bore 107. The vertical length of the rubber washer 112 is so determined that a compressive force will act on the washer when the bolt 110 is completely tightened up in the state shown in FIG. 3. Thus, the couplings 31 are biased toward the base plate 108 by the rubber washers 112. The rubber washers 112, which are elastic, can be further deformed by compression, so that the couplings 31 are movable away from the base plate 108. Accordingly, even if the upper surfaces of the couplings 31 are not flush with each other, the couplings 31 are brought closer to the on-off valve 7 as the on-off valve 7 is fastened to the couplings 31 with the body fixing bolts 113, which can therefore be tightened easily. Consequently, all the seals 76 can be subjected to a proper pressure to ensure fluid tightness.

Figure 4:
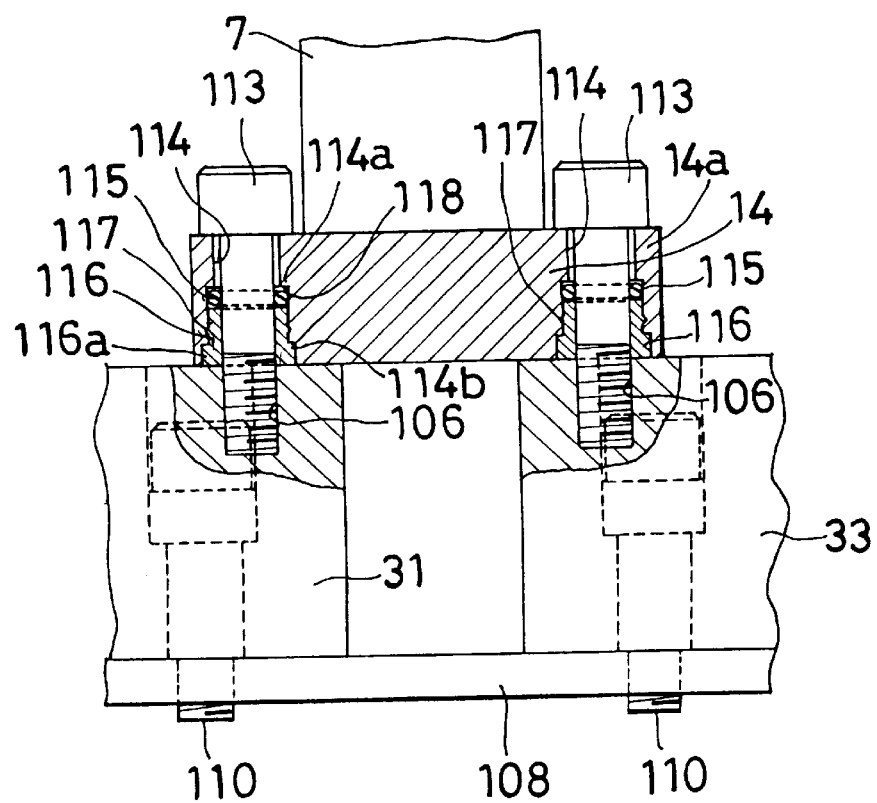
FIG. 4 is a sectional view showing the device of the invention for preventing a bolt from slipping off.

Next with referenceto FIG. 4, a description will be given of a device of the invention for preventing a bolt from slipping off, as preferred means for use in attaching the on-off valve 7 to the two block couplings 31, 33 with body fixing bolts 113.

With reference to the drawing, bolt shank bores 114 are formed in the flange 14a of the main body 14 of the on-off valve 7. Each of the shank bores 114 has stepped portions 114a and 114b respectively at an intermediate part of the bore and a part thereof close to the bore lower end to give the largest diameter to the lower end of the bore 114. An O-ring 115 is fitted in the shank bore 114 from its lower end in bearing contact with the intermediate stepped portion 114a. A bush 116 is further fitted in the bore 114 from the larger diameter side for preventing the O-ring 115 from slipping out. Thus, an annular recess 118 for accommodating the O-ring is defined by the intermediate stepped portion 114a, the upper end face of the bush 116 and the periphery of the bored portion 114 for the bolt shank. The bush 116 is formed at its lower end with a flange 116a in bearing contact with the stepped portion 114b close to the bore lower end. The bush 116 further has at an intermediate portion thereof an annular ridge 117 with an outside diameter slightly larger than the diameter of the shank bore portion having this intermediate portion fitted in. When the bush 116 is forced into the shank bore 114 from its larger diameter side, the flange 116a bears against the stepped portion 114b close to the bore lower end, and the annular ridge 117 is collapsed, whereby the bush 116 is prevented from slipping out, consequently preventing the O-ring 115 from slipping off. The O-ring 115 has an inside diameter slightly smaller than the outside diameter of the shank of the body fixing bolt 113. Since the O-ring is elastic, the shank of the bolt 113 can be forcibly inserted through the O-ring 115 with extreme ease. When the fixing bolt 113 is unfastened and becomes disengaged from the screw bore 106, the elastic force of the O-ring 115 retains the bolt 113 on the ring 115. Accordingly, even in the case where the base plate 108 is installed in a vertical position (as turned from the illustrated horizontal position thereof), this feature obviates the likelihood that the body fixing bolt 113 to be screwed in or removed will fall off to become lost.

What is claimed is:

1. A device for preventing a bolt from slipping off, comprising a member, to be fixed to a stationary member having a threaded bore, combined with a bolt and an annular elastic member for preventing said bolt from slipping off said member, said member to be fixed formed with a bolt shank bore, said device being adapted to prevent said bolt from slipping out of said shank bore when said bolt is unfastened, said device comprising:

an annular recess, which is formed completely in an intermediate part of a shank bore-defining inner periphery of said member to be fixed, said annular recess having said annular elastic member fitted therein, said annular elastic member having elasticity in a direction radially thereof and said annular elastic member having an inside diameter smaller than an outside diameter of a shank of said bolt.

2. The device for preventing a bolt from slipping off according to claim 1, wherein said shank bore has, at an intermediate part thereof, a first stepped portion so as to give an increased diameter to a bore portion extending from said intermediate part to an end of said bore, and further comprising a hollow cylindrical member for preventing said annular elastic member from slipping out, wherein said hollow cylindrical member is inserted in said shank bore from said end so as to form a clearance between said first stepped portion and said hollow cylindrical member, whereby said annular recess is formed.

3. The device for preventing a bolt from slipping off according to claim 2 wherein said first increased-diameter of said bore portion of said shank bore has a second stepped portion in a vicinity of said end so as to give a further increased diameter to a bore portion from said second stepped portion to said end, and said hollow cylindrical member is formed with a flange in contact with said second stepped portion.

4. The device for preventing a bolt from slipping off according to claim 2, wherein said hollow cylindrical member is formed with an annular ridge in engagement with a shank bore-defining wall for precluding said hollow cylindrical member from slipping out of said bolt shank bore.

* * * * *